United States Patent [19]

Deckers et al.

[11] Patent Number: 6,099,601
[45] Date of Patent: *Aug. 8, 2000

[54] ETHYLENE-VINYL FORMATE COPOLYMERS, PROCESS FOR THEIR PREPARATION, THEIR USE AS FLOW IMPROVERS, AND FUEL AND PROPELLANT COMPOSITIONS COMPRISING THEM

[75] Inventors: Andreas Deckers, Flomborn; Bernd Wenderoth, Lampertheim; Thomas Rühl, Frankenthal; Hans-Joachim Müller, Grünstadt; Roger Klimesch, Alsbach-Hähnlein, all of Germany

[73] Assignee: BASF Aktiengesellschaft, Ludwigshafen, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 08/802,906

[22] Filed: Feb. 20, 1997

[30] Foreign Application Priority Data

Feb. 29, 1996 [DE] Germany .................. 196 07 744

[51] Int. Cl.⁷ .................................................. C01L 1/18
[52] U.S. Cl. ................................................... 44/393
[58] Field of Search ............... 252/79, 73; 208/370; 508/118, 122; 526/318.45, 319, 328, 331, 348, 88; 44/393

[56] References Cited

U.S. PATENT DOCUMENTS

| | | | |
|---|---|---|---|
| 3,048,479 | 8/1962 | Ilnycki et al. | 44/62 |
| 3,159,608 | 12/1964 | Ilnyckyj | 260/87.3 |
| 3,382,215 | 5/1968 | Baum | 260/77.5 |
| 3,389,979 | 6/1968 | Brownsell et al. | 44/62 |
| 3,567,639 | 3/1971 | Aaron et al. | 252/56 |
| 3,638,349 | 2/1972 | Wisotsky et al. | 44/393 |
| 3,840,352 | 10/1974 | Scheffel | 44/62 |
| 4,087,255 | 5/1978 | Wisotsky et al. | 44/393 |
| 4,104,171 | 8/1978 | Stechmeyer | 252/8.3 |
| 4,247,438 | 1/1981 | Eck et al. | 260/26 |
| 4,491,455 | 1/1985 | Ishizaki et al. | 44/62 |
| 4,680,357 | 7/1987 | Flores et al. | 526/265 |

FOREIGN PATENT DOCUMENTS

| | | |
|---|---|---|
| 948211 | 5/1974 | Canada . |
| 136 698 | 4/1985 | European Pat. Off. . |
| 217 602 | 4/1987 | European Pat. Off. . |
| 344 353 | 12/1989 | European Pat. Off. . |
| 348 200 | 12/1989 | European Pat. Off. . |
| 44029741 | 12/1969 | Japan . |

OTHER PUBLICATIONS

Wu, T.K., NMR Studies On MicroStructure Of Ethylene Copolymers, J. Polym. Sci., Part A–2, 8, 167–72, 1970.

Wu, T.K., Nuclear Magnetic Resonance Studies On Microstructure Of Ethylene Copolymers, Macromolecules, 3 (5), 610–13, 1970.

*Ullmann's Enzyclopadie der Techn. Chemie*, 4 Ed., vol. 19, pp. 169–175. (untranslated).

*Primary Examiner*—Ellen M. McAvoy
*Attorney, Agent, or Firm*—Keil & Weinkauf

[57] ABSTRACT

Copolymer comprising ethylene units and vinyl formate units, the content of free vinyl formate in the polymer preferably being not more than 5000 ppm, based on the weight of the copolymer, a process for its preparation, and its use as flow improver, especially in petroleum distillates, preferably fuel and propellant compositions, especially petroleum middle distillates, and also a fuel and propellant composition comprising a principal quantity of a fuel and propellant and that quantity of a copolymer as above which is effective in improving the flow properties.

5 Claims, No Drawings

ETHYLENE-VINYL FORMATE COPOLYMERS, PROCESS FOR THEIR PREPARATION, THEIR USE AS FLOW IMPROVERS, AND FUEL AND PROPELLANT COMPOSITIONS COMPRISING THEM

The invention relates to ethylene-vinyl formate copolymers, to a process for their preparation, to the use of the copolymers as flow improvers, especially in petroleum middle distillates, such as diesel fuels and light heating oils, and to fuel compositions and propellant compositions comprising them.

U.S. Pat. No. 3,159,608 relates to the production of pour point depressants, in particular for use with middle distillates. A process is described for the copolymerization of ethylene and up to about 50% by weight of vinyl acetate, vinyl propionate, methyl methacrylate, allyl ethyl ether, divinyl ether, acrylonitrile or vinylacetonitrile. Preference is given to ethylene-vinyl acetate copolymers.

U.S. Pat. No. 3,389,979 relates to improving the flow properties of oils, especially middle distillates. It describes how good handling or flow properties of a fuel and propellant oil are obtained at low temperatures using a copolymer of ethylene and vinyl acetate.

U.S. Pat. No. 3,567,639 relates to a pour point depressant for crude oil, shale oil or fuel and propellant oil. This pour point depressant is a copolymer of ethylene and vinyl propionate, vinyl hexanoate, vinyl octanoate, vinyl dodecanoate, vinyl behenoate, isopropenyl acetate or octadecyl myristoate. A particularly preferred ester in this context is vinyl acetate.

The known ethylene-vinyl acetate copolymers have the disadvantage that their flow improver action is not equally good universally, in all petroleum distillates. Their action depends, inter alia, on the origin of the crude oil on which the petroleum distillate is based, on the processing technique employed for the crude oil, and on the nature and quantity of n-paraffins in the petroleum distillate.

Processes for the polymerization and copolymerization of ethylene are known and are described, for example, in Ullmanns Enzyklopädie der Technischen Chemie, 4th edition, Volume 19, pp. 169–223, especially pp. 169–175.

It is an object of the present invention to provide a flow improver which avoids the disadvantages described for ethylene-vinyl acetate copolymers.

It is a further object of the present invention to provide a flow improver for petroleum distillates which is effective for a large number of petroleum distillates.

It is another object of the present invention to provide a process for preparing this flow improver.

It is a further object of the present invention to provide fuel and propellant compositions having improved flow properties.

We have found that these objects are achieved by the novel copolymers comprising ethylene units and vinyl formate units, the preparation processes, wherein the monomers ethylene, vinyl formate and, if used, further monomers are subjected to free-radical polymerization in a stirred autoclave, a tubular reactor or a stirred autoclave with downstream tubular reactor at a pressure of from 500 to 3500 bar at from 150 to 330° C. in the presence of at least one free-radical initiator comprising preferably organic peroxides which decompose to form free radicals, or air or oxygen, and in the presence, if used, of a molecular weight regulator, for a reaction time of from 60 to 240 s, the use of the copolymers and the fuel and propellant compositions, as described in the following. We have also found that other objects are achieved by means of the preferred embodiments.

In accordance with the invention it has been found that copolymers comprising ethylene units and vinyl formate units (ethylene-vinyl formate copolymers) can be used as flow improvers for petroleum distillates and that they give the petroleum distillates better properties than is the case when ethylene-vinyl acetate copolymers are used.

Ethylene-vinyl formate copolymers

The novel copolymers include ethylene units and vinyl formate units. According to one embodiment of the invention, the vinyl formate units make up 1–50%, preferably 10–40%, in particular 20–35%, by weight of the copolymer. According to one embodiment the ethylene units form the remainder of the copolymer; in other words, the copolymer consists of ethylene units and vinyl formate units (apart from residues of a free-radical initiator or molecular weight regulator).

The copolymer can also include other kinds of monomers, for example vinyl acetate, vinyl propionate, acrylates and methacrylates, such as methyl acrylate and ethyl, propyl, butyl, amyl, ethylhexyl, decyl, dodecyl and stearyl acrylates and methacrylates.

The amounts of these other monomers are preferably in a range from 0.1 to 20% by weight, preferably from 1 to 10% by weight, based on the copolymer.

The number-average molecular weight of the novel copolymer is, according to one embodiment of the invention, 500–200,000, preferably 500–10,000, in particular 500–5000 g/mol. This molecular weight can be determined by means of vapor phase osmometry.

It is common to determine, rather than the number-average molecular weight, the melt viscosity of the resulting copolymer, which permits conclusions to be drawn about the molecular weight.

This melt viscosity is determined using a rotary viscometer in accordance with DIN 53019 at 120° C. According to one embodiment of the invention, the copolymers have melt viscosities at 120° C. of from 10 to 10,000 cst, preferably from 50 to 1000 cst, in particular from 100 to 500 cst.

In addition to the abovementioned units the novel copolymers include small amounts of free-radical initiators and, if used, molecular weight regulators, which are added to the monomer mixture in order, respectively, to initiate and to regulate the polymerization. In the course of polymerization, these substances are bonded at least in part in the polymer main chain.

The novel copolymers can be employed in combination with one or more customarily used additives, examples being antioxidants, corrosion inhibitors, conductivity improvers, lubricity additives, paraffin dispersants, detergent additives, cetane number improvers, antifoam additives, stability improvers or other flow improvers.

Preparation of the ethylene-vinyl formate copolymers

The vinyl formate used to prepare the novel copolymers can be prepared by the method described in WO 95/09877.

Processes for the polymerization of ethylene and, if desired, of comonomers are known and are described, for example, in Ullmanns Enzyklopädie der Technischen Chemie, 4th edition, Volume 19, pp. 169–175.

In accordance with one embodiment of the invention, this polymerization is carried out in a stirred autoclave, which can for example be a compact autoclave or an elongate reactor. It is advantageous if the contents of the autoclave can be mixed thoroughly using a stirrer.

In the polymerization of ethylene and vinyl formate, the conversion is generally within a range from 1 to 35%.

For polymerization, a compressed gas mixture of the monomers is supplied to the reactor simultaneously with a free-radical initiator used to start the free-radical polymerization. According to one embodiment of the invention, use is made of preferably organic peroxides which decompose into free radicals and which are introduced, if appropriate, in the form of a solution in a solvent. The use of air and/or oxygen is likewise possible.

Reaction temperature and product data (such as comonomer composition or melt index) are established by adapting the reaction conditions (initiator, pressure, gas input temperatures, molecular weight regulator if present) to preset target figures. In the case of an elongate reactor type, the reaction can be controlled with precision by means of a plurality of initiator feed pumps arranged along the reactor.

In accordance with one embodiment of the invention reaction is carried out at 150–330° C. under a pressure of 500–3500 bar.

The reaction time or residence time in the reactor is, according to one embodiment of the invention, 60 to 240 s, so that the free vinyl formate content in the copolymer is low: not more than 5000 ppm.

According to another embodiment of the invention, a tubular reactor is used for the polymerization of the ethylene and vinyl formate.

In this case the reactor length, according to one embodiment of the invention, is from 600 to 2000 meters and the internal diameter of the tube is from 15 to 60 mm. The tubular reactor can be configured as a single-zone reactor or as a tubular reactor with cold-gas and initiator afterfeed.

In the case of the single-zone reactor, the entire mixture to be reacted, comprising ethylene, vinyl formate, any other comonomers, free-radical initiators and, if used, molecular weight regulators, is introduced at the reactor entrance and is heated in a preheater to the temperature which is required at the beginning of polymerization.

In the tubular reactor with cold-gas and free-radical initiator afterfeed, the monomer stream supplied to the reactor is divided into at least two substreams. Cold monomers or initiator, alone, are introduced at certain points in the reactor.

In the tubular reactor method, the initiator used is a preferably organic peroxide which decomposes into free radicals, or is air or oxygen, or a mixture thereof.

The pressure, temperature and reaction or residence time in the reactor are as described for the stirred autoclave.

According to a further embodiment of the invention the polymerization is carried out in a stirred autoclave. The autoclave can be followed by a tubular reactor.

The reaction mixture leaving the reactor or reactors is, in accordance with one embodiment, first of all depressurized in a high-pressure separator to 200–300 bar and then in a downstream low-pressure separator to 1–3 bar. In the latter separator, waxy and liquid reaction products are separated off using appropriate equipment.

According to one embodiment of the invention the polymerization process is continuous, with the monomers, the free-radical initiator and, if used, the molecular weight regulator being supplied continuously and with unreacted monomers being circulated. In this case, according to one embodiment of the invention, the reactor or reactors is or are resupplied both with the mixture of starting materials from the high-pressure separator and with the starting materials from the low-pressure separator.

In this context, in accordance with one embodiment of the invention, the unreacted starting materials from the low-pressure separator are supplied, with additional starting-material mixture, to a precompressor, while the unreacted starting materials from the high-pressure separator are passed directly to a post compressor located between precompressor and reactor. In this embodiment, the monomers are supplied to the reactor via a precompressor and/or postcompressor.

FREE-RADICAL INITIATORS

For the novel copolymerization of ethylene and vinyl formate it is possible to employ any suitable free-radical initiators. According to one embodiment of the invention use is made of at least one free-radical initiator, comprising preferably organic peroxides which decompose to form free radicals, or air or oxygen.

Examples of suitable free-radical initiators are organic peroxides, such as peresters, perketals and percarbonates.

According to one embodiment of the invention the free-radical initiator is a mixture of tert-butyl perpivalate and tert-butyl perisononanoate in a molar ratio of from 10:1 to 1:10, preferably from 5:1 to 1:5, especially 1:1.

According to a preferred embodiment of the invention the mixture of ethylene and vinyl formate is polymerized with 10–1000 mol-ppm (based on ethylene and vinyl formate), preferably 20–100 mol-ppm, of a free-radical initiator comprising tert-butyl perpivalate and tert-butyl perisononanoate in a molar ratio of 1:1, at less than 270° C.

MOLECULAR WEIGHT REGULATORS

When using either a stirred autoclave or a tubular reactor, the molecular weight regulators used are, in accordance with one embodiment of the invention, aliphatic and olefinic hydrocarbons, and also, preferably, aliphatic aldehydes, especially propionaldehyde. Any other compound which is suitable as a molecular weight regulator can likewise be employed in accordance with the invention.

The reaction products which separate out are employed without further treatment.

Unpolymerized vinyl formate or other monomers, if present, can remain in the product.

The molecular weight of the polymer is determined as described above via the determination of its viscosity.

In addition to ethylene and vinyl formate it is possible to copolymerize other kinds of monomers. Examples of suitable comonomers are indicated above.

According to a preferred embodiment, only ethylene and vinyl formate are the monomers polymerized to form a copolymer consisting essentially of ethylene units and vinyl formate units, in particular only of ethylene units and vinyl formate units.

USE OF THE ETHYLENE-VINYL FORMATE COPOLYMERS

In accordance with the invention, the novel copolymers can be used as flow improvers, especially as flow improvers in petroleum distillates, preferably in fuel and propellant compositions, especially in middle distillates such as diesel fuels and light heating oils.

In this context, in accordance with one embodiment of the invention, the content of free, unpolymerized vinyl formate in the copolymer should not exceed a value of 5000 ppm (based on the overall weight of the copolymer).

In this context, the improvement in the flow properties can be determined in accordance with DIN EN 116 as a reduction in the cold filter plugging point (CFPP).

FUEL AND PROPELLANT COMPOSITIONS

The novel fuel and propellant compositions comprise a major proportion of a fuel and propellant, and that quantity of a copolymer as described above which is effective in improving the flow properties.

In accordance with one embodiment of the invention, this fuel and propellant composition comprises a middle distillate and 0.001–5% by weight, preferably 0.001–0.2% by weight, in particular 0.01–0.1% by weight, of the copolymer, based on the overall weight of the composition.

The present invention is illustrated in more detail by reference to the following examples:

EXAMPLE 1
Preparation of the Ethylene-vinyl Formate Copolymers

The copolymerization of ethylene and vinyl formate was carried out in a continuously operated stirred autoclave with an internal volume of 1 liter. The reaction pressure was constant at 1500 bar and the reaction temperature, established by means of continuously metered in peroxide, was 220° C. The throughput of ethylene was 350 mol/h. The free-radical initiator used was a mixture of tert-butyl perpivalate (TBPP) and tert-butyl perisononanoate (TBPIN) in a molar ratio of 1:1, dissolved in isododecane. The molecular weight regulator used was propionaldehyde, and was metered into the gas mixture. The amounts of peroxide indicated in the table below are based on the monomer concentration of ethylene and vinyl formate in mol-ppm. The process parameters for the preparation of the copolymers are indicated in Table 1 below.

TABLE 1

Process parameters

| Product | Vinyl formate [% by wt.] | Peroxide [mol-ppm] | Propion- aldehyde [% by wt.*] | Reaction time [s] |
|---|---|---|---|---|
| EVF 1 | 7.4 | 33 | 2.7 | 180 |
| EVF 2 | 13.7 | 41 | 2.0 | 180 |
| EVF 3 | 18.2 | 45 | 1.3 | 180 |
| EVF 4 | 26.2 | 59 | 0.4 | 180 |

*based on the overall amount of monomers

In the course of polymerization a monomer mixture of ethylene and vinyl formate in the composition indicated in the table was injected continuously in order to maintain the pressure at 1500 bar. The product was worked up by letting it down to atmospheric pressure. There was no subsequent treatment. The vinyl formate can be metered in either on the suction side of the postcompressor (about 200–250 bar) or directly into the reactor (>1500 bar). The properties of the resulting copolymers are indicated in Table 2 below.

TABLE 2

Ethylene-vinyl formate copolymers

| Product | Vinyl formate [% by weight] | Visc. (120° C.) [cst] | Residual VF [ppm] |
|---|---|---|---|
| EVF 1 | 7.4 | 400 | 1600 |
| EVF 2 | 13.7 | 350 | 2000 |
| EVF 3 | 18.2 | 490 | 2300 |
| EVF 4 | 26.2 | 420 | 2700 |

The viscosity indicated is the melt viscosity determined at 120° C. in accordance with the above-described method.

The content of vinyl formate units in the copolymer was determined by elemental analysis.

The residual vinyl formate (residual VF) content was determined by elemental analysis prior to and following a reprecipitation of the polymer from toluene.

EXAMPLE 2
Fuel and Propellant Compositions

The novel copolymers were tested in a series of fuel and propellant compositions which were petroleum middle distillates. These distillates are diesel fuels and light heating oils of normal European commercial refinery quality. They have the properties indicated in Table 3 below.

TABLE 3

Properties of the middle distillates used

| Middle distillates (MD) | MD 1 | MD 2 | MD 3 | MD 4 | MD 5 | MD 6 |
|---|---|---|---|---|---|---|
| Cloud point (° C.) | +6 | +6 | +2 | −3 | −5 | −8 |
| CFPP (° C.) | +3 | 0 | −2 | −7 | −8 | −10 |
| Density; 20° C. (g/ml) | 0.847 | 0.850 | 0.885 | 0.832 | 0.838 | 0.831 |
| Boiling point (° C.) | 162 | 155 | 170 | 170 | 167 | 175 |
| 20% boiling point (° C.) | 210 | 232 | 230 | 203 | 221 | 223 |
| 90% boiling point (° C.) | 348 | 353 | 348 | 270 | 328 | 314 |
| Final boiling point (° C.) | 385 | 382 | 365 | 300 | 361 | 352 |

The cloud point (CP) was determined in accordance with ASTM D 2500 and the cold filter plugging point (CFPP) in accordance with DIN EN 116.

The 20% boiling point and 90% boiling point are the temperatures at which 20% by volume and 90% by volume, respectively, of the initial mixture have distilled.

The flow improvers of Example 1, used in a 50% strength solution in solvent naphtha, were added to the above petroleum middle distillates. For comparison purposes, known flow improvers designated as MDFI 1 and MDFI 2 were also used. MDFI 1 is a copolymer comprising ethylene units and vinyl propionate units, containing about 40% by weight of the latter, with a melt viscosity of 380 cst. MDFI 2 is a copolymer comprising ethylene units and vinyl acetate units, containing about 30% by weight of the latter, with a melt viscosity of 420 cst.

The flow improvers were introduced into the corresponding oils in the amounts indicated in Table 4 below and were intimately mixed therewith.

The cold filter plugging point (CFPP) was then determined in accordance with DIN EN 116. The results are likewise compiled in Table 4 below.

TABLE 4

| Copolymer | Amount added (ppm) | CFPP (° C.) in middle distillate | | | | | |
|---|---|---|---|---|---|---|---|
| | | MD 1 | MD 2 | MD 3 | MD 4 | MD 5 | MD 6 |
| — | — | +3 | 0 | −2 | −7 | −8 | −10 |
| EVF 1 | 300 | | | | | | −16 |
| EVF 2 | 300 | | | | | | −18 |
| EVF 3 | 300 | | | | −7 | −16 | −19 |
| EVF 4 | 300 | | | | −12 | −20 | −25 |
| EVF 3 | 500 | −12 | −9 | | | −18 | |
| EVF 4 | 500 | −16 | −2 | | | −24 | |
| MDFI 1 | 500 | −2 | −2 | | | | |
| MDFI 2 | 500 | −1 | −2 | | | | |

The table shows that the novel ethylene-vinyl formate copolymers can be used as flow improvers in a large number of petroleum middle distillates and exhibit substantially lower cold filter plugging points than known flow improvers based on ethylene-vinyl propionate or ethylene-vinyl acetate copolymers.

What is claimed is:

1. A method of improving the flow of petroleum middle distillates, consisting essentially of the step of admixing a copolymer consisting of ethylene units and vinyl formate units as the sole flow improver.

2. The method of claim 1, wherein the petroleum middle distillates is a member selected from the group consisting of fuel and propellant compositions.

3. The method of claim 1, wherein the content of free vinyl formate in the polymer is not more than 5000 ppm based on the weight of the copolymer.

4. The method of claim 1, wherein the amount of vinyl formate units in the copolymer is from 1 to 50%, 35%, by weight of the copolymer.

5. The method of claim 1, wherein the amount of vinyl formate units in the copolymer is from 20 to 35% by weight of the copolymer.

* * * * *

UNITED STATES PATENT AND TRADEMARK OFFICE
CERTIFICATE OF CORRECTION

PATENT NO. : 6,099,601
DATED : August 8, 2000
INVENTOR(S) : Deckers et al.

It is certified that error appears in the above-identified patent and that said Letters Patent is hereby corrected as shown below:

<u>Column 8, claim 4,</u>
Line 2, delete ", 35%"

Signed and Sealed this

Twenty-ninth Day of January, 2002

Attest:

Attesting Officer

JAMES E. ROGAN
*Director of the United States Patent and Trademark Office*